Jan. 11, 1966          H. J. BUNCH          3,228,546
TRACTOR-TRAILER HITCH
Filed Nov. 15, 1963          4 Sheets-Sheet 1
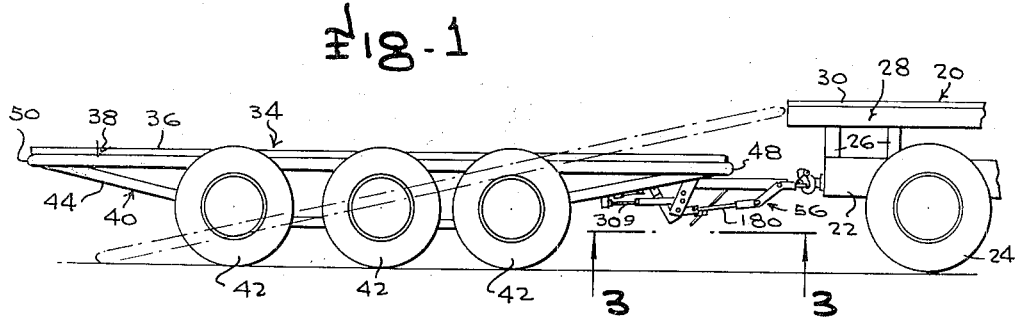
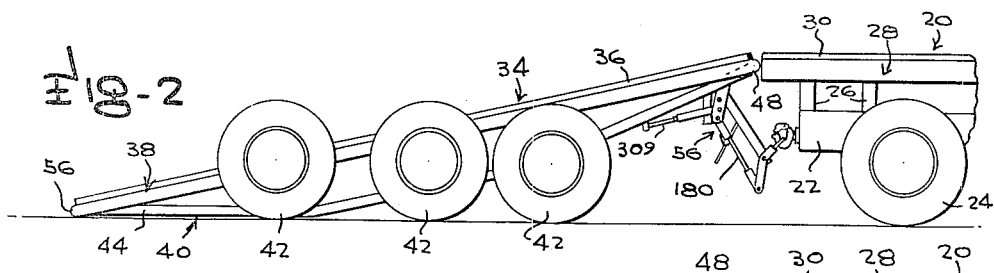
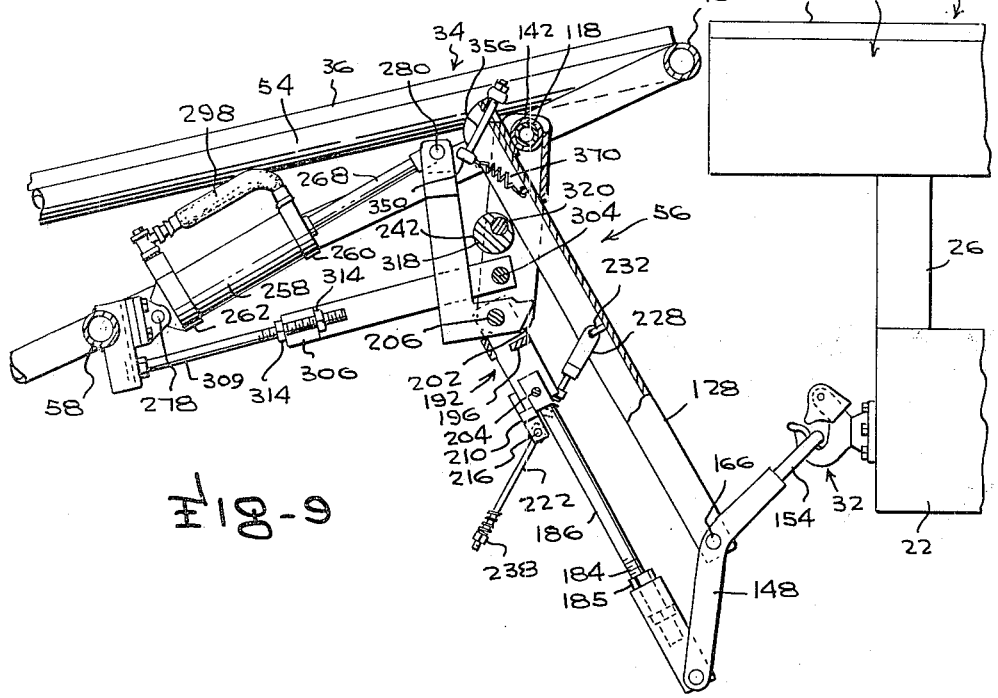
INVENTOR.
HARRY J. BUNCH
BY
McMorrow, Berman & Davidson
ATTORNEYS Jan. 11, 1966  H. J. BUNCH  3,228,546
TRACTOR-TRAILER HITCH
Filed Nov. 15, 1963  4 Sheets-Sheet 2
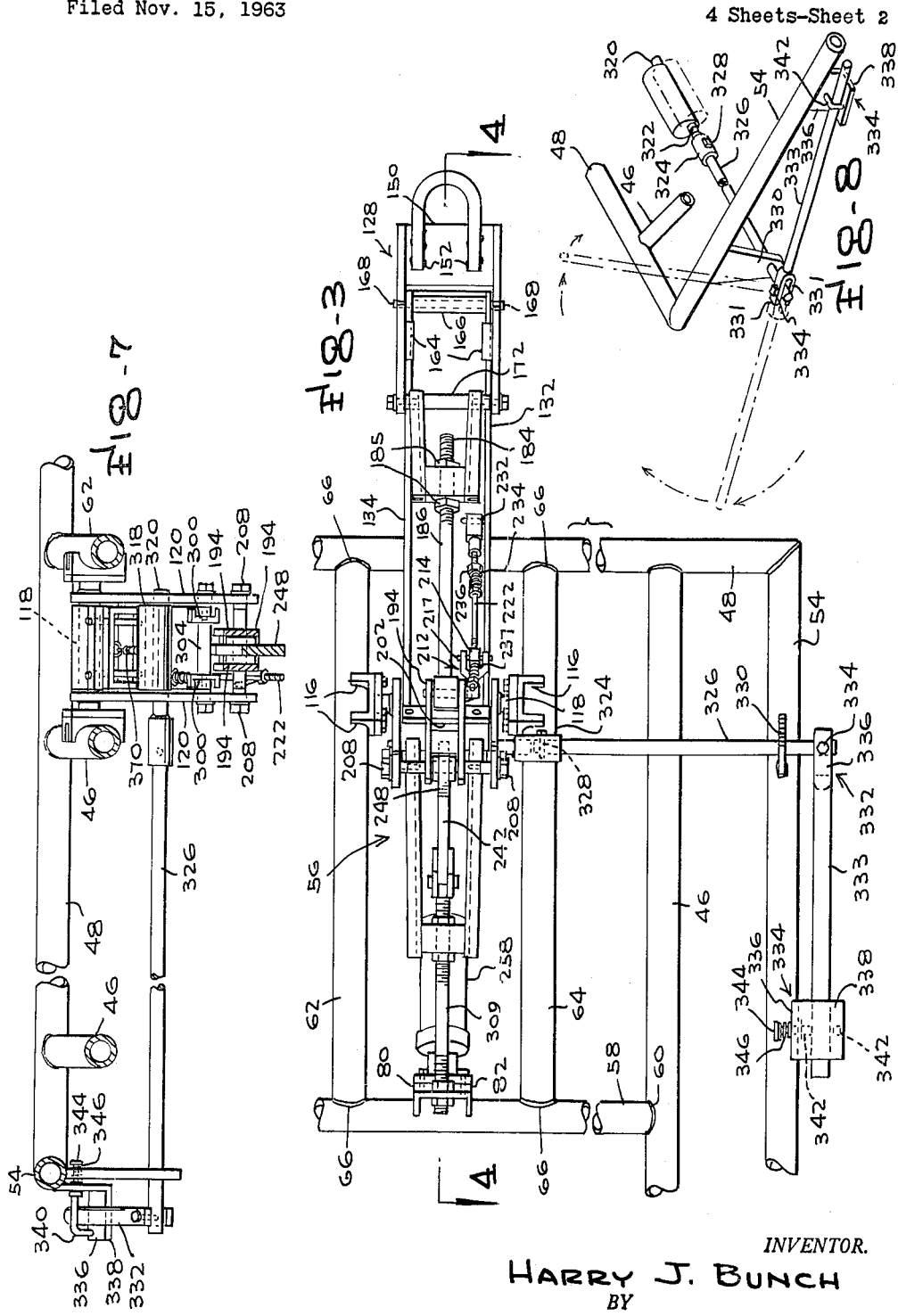
INVENTOR.
HARRY J. BUNCH
BY
McMorrow, Berman & Davidson
ATTORNEYS

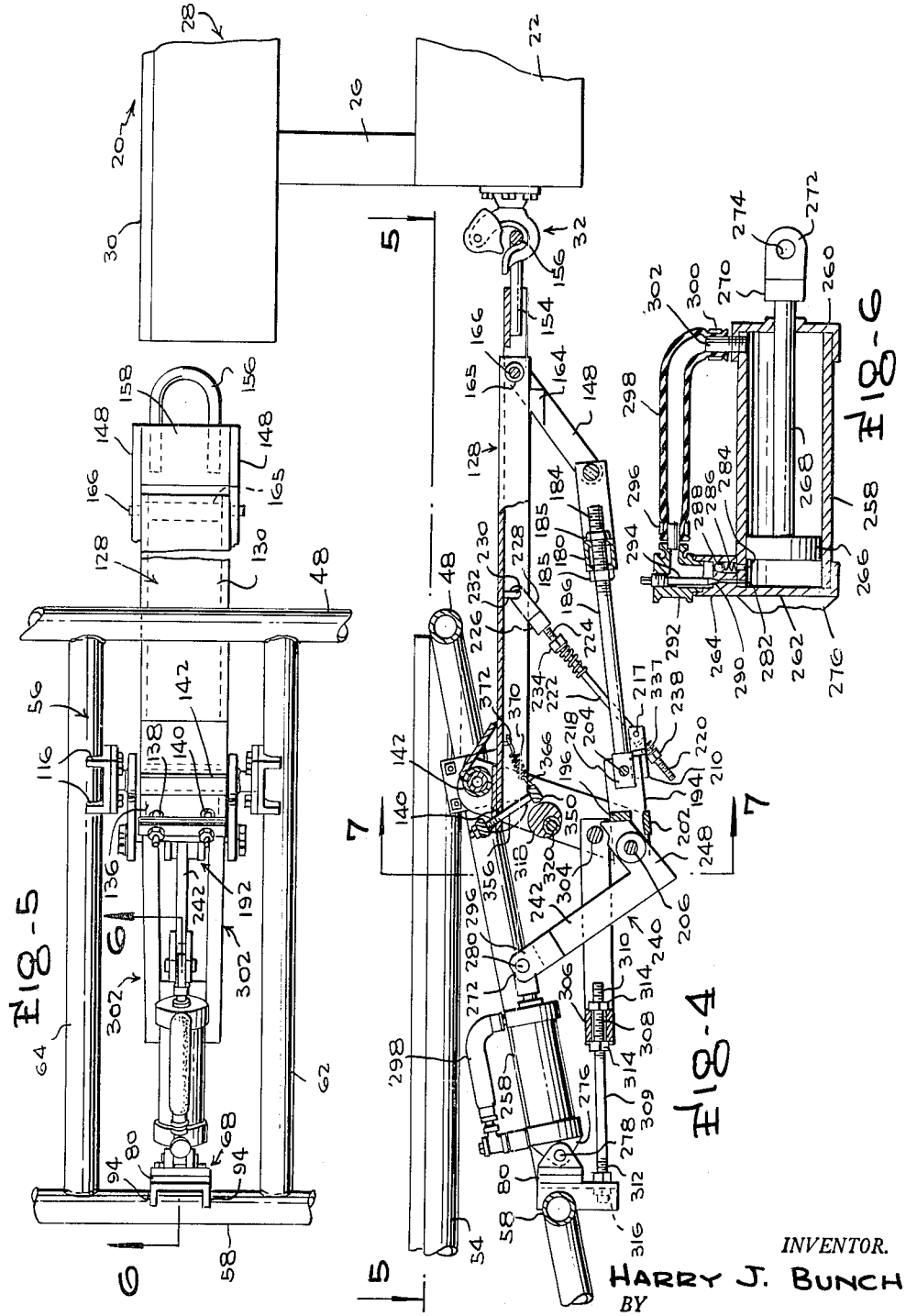

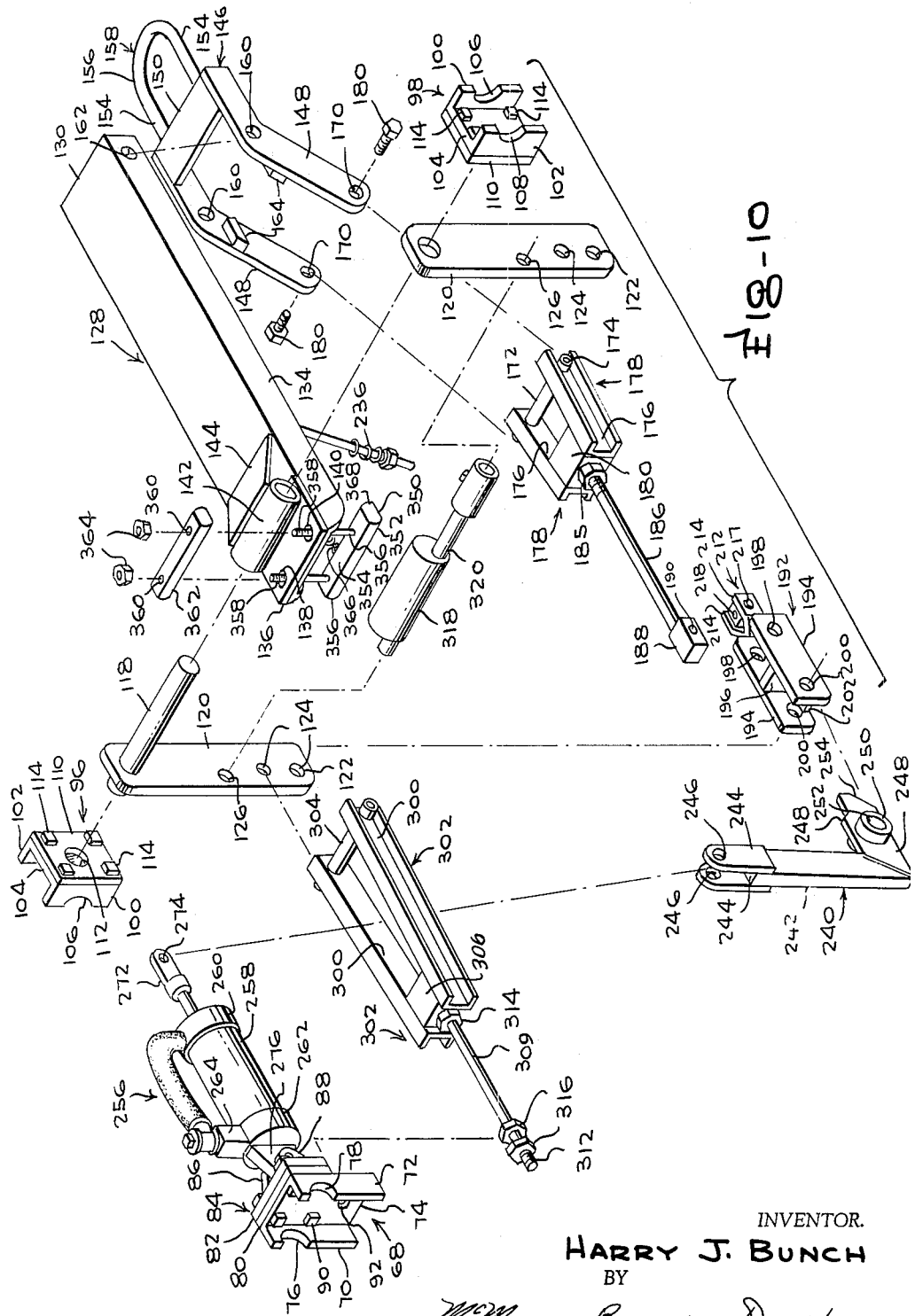

United States Patent Office 3,228,546
Patented Jan. 11, 1966

1

3,228,546
TRACTOR-TRAILER HITCH
Harry J. Bunch, 1108 Clay Ave., Louisville, Ky.
Filed Nov. 15, 1963, Ser. No. 324,006
11 Claims. (Cl. 214—505)

This invention relates to the general field of connector means and, more specifically, the instant invention pertains to means for connecting together two or more land vehicles.

One of the primary objects of this invention is to provide a hitch between an automotive vehicle and a drawn vehicle of the trailer type.

Another object of this invention is to provide a tractor-trailer hitch together with means for adjusting the bed of the trailer at desired angles relative to a horizontal plane including the bed of the prime moving vehicle.

A further object of this invention is to provide a tractor-trailer hitch with adjustable means to effect a towing connection between a trailer and an automotive vehicle, and to afford means for inclining the bed of the trailer relative to the plane of the bed of the automotive vehicle to facilitate the loading and unloading of both.

A still further object of this invention is to provide a tractor-trailer hitch of the type generally referred to supra, the hitch being noncomplex in construction and assembly, inexpensive to manufacture and maintain, and one which is durable in use.

Other and further objects and advantages of the instant invention will become more evident from a consideration of the following specification when read in conjunction with the annexed drawings, in which:

FIGURE 1 is a side elevational view of a tractor or other automotive vehicle and trailer therefor, FIGURE 1 showing the component elements of the hitch therebetween in their respective towing positions;

FIGURE 2 is a side elevational view of a tractor and automotive vehicle, the trailer being shown in its loading position, and FIGURE 2 illustrating the relative positions of the component parts of the hitch under this condition;

FIGURE 3 is a bottom plan view of the tractor-trailer hitch shown in FIGURES 1 and 2, FIGURE 3 illustrating the hitch in its towing position;

FIGURE 4 is a detail cross-sectional view, partly in elevation, FIGURE 4 being taken on the horizontal plane of line 4—4 of FIGURE 3, looking in the direction of the arrows;

FIGURE 5 is a top plan view of the tractor-trailer hitch;

FIGURE 6 is a detail, medial, longitudinal cross-sectional view of the hydraulic means employed in this invention;

FIGURE 7 is a fragmentary end elevational view of the hitch, partly in cross-section, FIGURE 7 being taken substantially on the vertical plane of line 7—7 of FIGURE 4, looking in the direction of the arrows;

FIGURE 8 is a schematic perspective view illustrating the position taken by the lock release cam and its operating handle;

FIGURE 9 is a longitudinal, medial, cross-sectional view, partly in elevation, FIGURE 9 showing the relative positions of component elements of the trailer hitch assembly when the tractor-trailer is in its loading position, as shown in FIGURE 2; and FIGURE 10 is an exploded, perspective view of the tractor-trailer hitch assembly.

Referring now more specifically to the drawings, reference numeral 20 designates, in general, a tractor, truck or other automotive vehicle of conventional construction and which includes the usual chassis frame 22 suitably suspended on wheels 24. Reference numeral 26 denotes

2 the customary standards secured at their lower ends to the chassis frame 22 and which support, at their respective upper ends, a tractor frame 28 across which extends a tractor platform 30. To the rear of the chassis frame 22 is connected a conventional automatic locking hitch or coupler 32 (see FIGURES 4 and 9).

Reference numeral 34 generally indicates a tractor-trailer preferably, but not necessarily, constructed in accordance with the teachings of my patent entitled, "Hitch and Trailer Having Improved Wheel Suspension of the Tandem Type," Serial No. 9,978, filed on February 19, 1960, and which issued on January 1, 1963, as Patent No. 3,071,267.

The tractor-trailer 34 includes a trailer ramp or bed 36 fixedly secured to and extending across a suitable substantially open rectangular frame 38, the latter being supported on suspension frame members 40 carried on wheels 42. The suspension frame members are designated at 44, 46. The open frame 38 includes front and rear end frame members 48, 50, respectively, see FIGURES 1 and 2, and side frame members 52, 54, respectively, see FIGURES 3, 4 and 9. Since the details of construction of the trailer 34 are not essential to this invention, a more elaborate description thereof is not deemed necessary, and this brief reference thereto has been offered merely to lend environment to the invention described below. It should be understood, however, that while the frame 38 and suspension frame members 40 have been illustrated herein for the purposes of clarity, as having a hollow, cylindrical configuration, the configuration of these elements may vary as a mere matter of design.

The tractor-trailer hitch to which this invention pertains is generally designed by reference numeral 56. As disclosed, the tractor-trailer hitch 56 is seen to include a substantially hollow tubular crossbar 58 which extends between and has its opposed ends fixedly secured to the suspension frame members 44, 46, as by welding at 60. Extending perpendicularly between the crossbar 58 and the front frame member 48 are a pair of elongated, laterally-spaced, and substantially parallel hollow tubular hanger rods 62, 64 having their opposed ends fixedly connected, as by welding 66, to the crossbar 58 and front frame member 48 at points substantially equidistant from the mid-point of the latter.

A substantially U-shaped bracket member 68 (see FIGURE 10) is provided, the bracket member 68 having elongated, parallel, and laterally-spaced sidewalls 70, 72 interconnected by a bight 74. The sidewalls 70, 72 adjacent their upper ends are formed with arcuately-shaped recesses 76, 78 facing away from the bight 74. Superimposed against the bight 74 adjacent the upper end thereof is a reinforcing substantially rectangular block 80 and superposed against the block 80 is a substantially rectangular base 82, of the bracket 84, having laterally-projecting spaced and substantially parallel lugs 86, 88. Rivets or bolts 90 extend through the bight 74, the reinforcing block 80 and the base 82 securing the same as a unit. The lower end of the bight 74 is provided with a transversely-extending opening 92. The crossbar 58 is received within the arcuate recesses 76, 78 and the arms 70, 72 are rigidly secured thereto as by welding at 94.

Substantially U-shaped hanger brackets are designated at 96, 98 and each is seen to comprise a laterally-spaced and substantially parallel side arms 100, 102 having a connecting bight 104. The outer ends of the arms 100, 102 are formed with arcuate recesses 106, 108 facing away from the bights 104 and superimposed against the bights are substantially rectangular journal plates 110 centrallyapertured as at 112, and which are secured to bights 104 as by rivets or bolts 114.

The hanger rods 62, 64 are received within the recesses 76, 78 and are joined to the side arms 100, 102 as by welding 116, the hanger brackets being disposed in confronting relationship relative to one another.

Extending transversely between the hanger brackets 96, 98 and pivotally journaled within the apertures 112 of the journal plates 110 are the opposed ends, respectively, of a shaft 118. As is seen in the drawings, a substantially rectangular support plate 120 is pivotally mounted adjacent its upper end on each end, respectively, of the shaft 118 and depend therefrom. Each of the depending lower ends of the support plates 120 is formed with transverse, vertically-spaced openings 122, 124, 126 of which the center line of the opening 124 is offset inwardly from the center lines of the openings 122, 126.

Reference numeral 128 designates an elongated, downwardly-facing, substantially U-shaped channel member having a bight 130 from the longitudinally-extending marginal edges of which project the downwardly-extending sidewalls 132, 134. Fixedly secured to the inner end of the bight 130 is a substantially rectangular plate 136, both the bight 130 and the mounting plate 136 adjacent their respective ends being bored to form a pair of laterally-spaced and substantially parallel continuous openings 138, 140 to serve a function to be described.

Fixedly secured to the upper side of the mounting plate 136 and extending longitudinally thereof is a substantially hollow, cylindrical sleeve 142 that is telescoped over the shaft 118 and which is freely pivotal thereon. The sleeve 142, as is seen in the drawings, is centrally-located relative to the ends of the shaft 118. A substantially rectangular connector plate 144 has a side thereof of equal length as the axial length of the sleeve 142, and the aforementioned side is rigidly connected, as by welding, to the other side of the sleeve 142. As is seen in the drawings, the connector plate 144 inclines downwardly and forwardly from the sleeve 142 at an acute angle toward the bight 130, and at its oppositely-disposed side it is rigidly fixed to the bight 130 at its point of contact therewith.

Referring now more specifically to FIGURES 3, 4 and 10, reference numeral 146 denotes, in general, a bracket structure which includes a pair of identical L-shaped side arms 148, 148 disposed in spaced, parallel, and confronting relation. Extending between and fixedly secured to a pair of adjacent ends of the arms 148, 148 is a substantially rectangular connector plate 150. Fixedly secured to the plate 150 as by welding 152, are the free ends of a pair of cylindrical side arms 154. The arms project beyond the forward edge of the plate 150 and the projecting ends are connected together by an arcuate bight 156 to form a conventional coupler 158. Side arms 148, 148 adjacent the apices thereof are transversely-bored at 160, 160 and are adapted for alignment with the openings 162 formed in the sidewalls 132, 134 adjacent their respective outer ends. The downwardly-inclined free ends of the side arms 148, 148, adjacent the openings 160 are integral with a pair of stop lugs 164, 164 disposed in spaced, confronting relation.

A spacer sleeve 165 extends transversely between the side arms 148, 148 in which is telescopically received an elongated rod 166 having opposed internally-threaded ends aligned with the openings 162, 162. The openings 160, 160 are aligned with the openings 162, 162 and the coupler 158 is pivotally secured to the channel member 128 by bolts 168, 168 which extend through the openings 160, 160 and 162, 162, respectively, and into the threaded ends of the rod 166. The arrangement is such that the side arms 148, 148 are disposed proximate the sidewalls 132, 134, and in the path of movement of the stop lugs 164, whereby, when the ramp 36 is pivoted from the position shown in FIGURE 2 to the position illustrated in FIGURE 1, the bracket 146 turns in a clockwise direction until the stop lugs 164 engage against the lower edges of the sidewalls 132, 134, thereby halting further pivotal movement therebetween in this direction, and limits the pivotal movement of the ramp 36 in the clockwise direction, as viewed in FIGURES 1 and 2. The rotation of the bracket in the counterclockwise direction will, of course, disengage the stop lugs 164 from the sidewalls 132, 134.

As is seen in the drawings, the side arms 148, 148 adjacent their respective lower ends are formed with registering openings 170, 170. An elongated shaft 172 extends transversely between the side arms 148, 148 and the opposed ends thereof are internally-threaded, as at 174. Referring to FIGURES 3 and 10, it is seen that a pair of adjacent ends of a pair of bights 176, 176 of a pair of outwardly-opening U-shaped channel members 178 are pivotally mounted on the shaft 172 adjacent the opposed ends thereof, respectively. As is clearly seen in these figures, the confronting bights 176, 176 converge rearwardly, or to the left as viewed in these figures. The shaft 172 is inserted between the arms 148, 148 and is aligned with the openings 170. Bolts extend through the openings 170 and are secured to the opposed taps 174 to secure the shaft 172 thereto.

A wedge block 180 is disposed between the bights 176, 176 adjacent the converging ends thereof, the wedge block 180 having a bore 182 extending in the direction of the longitudinal axis of the bight 130. One end 184 of an elongated rod 186 is threaded and passed through the bore 182 to extend on opposite sides of the block 180. Nuts 185 are threaded on the end 184 to engage opposite ends of the block 180 and to lock the rod 186 in adjusted relation relative to the block 180. The other end of the rod 186 terminates in an enlarged, substantially rectangular boss 188 having a bore 190 extending therethrough, the bore 190 having its axis substantially parallel to the longitudinal axis of the shaft 172, and further reference to the boss 188 will be made below.

Reference numeral 192 denotes an elongated, substantially H-shaped connector which includes a pair of oppositely-disposed, substantially rectangular, laterally-spaced and parallel side arms 194, 194 connected by a centrally-located bight 196. The adjacent pairs of ends of the side arms 194, 194 are provided with coaxially-aligned pairs of openings 198, 198 and 200, 200, respectively, adjacent their respective ends. A second bight 202 is formed integrally with the side arms 194, 194 and is disposed intermediate the bight 196 and the openings 200 adjacent the lower edges of the side arms 194, 194. A pivot pin 204 extends through the openings 198, 198 and the bore 190 to connect together, pivotally, the boss 188 and the connector 192. The other ends of the connector 192 are interposed between the plates 120, 120 with the openings 200, 200 aligned with the openings 122, 122. A pivot pin 206 extends through the openings 200 between the plates 120, 120 and has opposed threaded ends to receive bolts 208, 208, the latter passing through the openings 122, 122 and securing the pin 206 to the plates 120, 120.

The connector 192 has rigidly secured to one of the side arms 194 the stem 210 of a yoke 212 having laterally-spaced and substantially parallel arms 214, 214. Disposed between the arms 214, 214 is a substantially rectangular block 216 pivotally supported thereon by pivot pin 217. The block 216 is formed with a transversely-extending passage 218 which receives therethrough a threaded end 220 of a rod 222 having an opposed threaded end 224. The end 224 is threaded into a boss 226 at one end of a link 228 having an aperture 230 at its outer end. An arcuate hook 232 having its ends fixedly secured to the underside of the bight 130 extends through the aperture 230 to pivotally connect the link 228 thereto. Threaded on the threaded end 224 is an adjustable nut 234 to which is fixedly secured one end of a helicoidal spring length 236 that surrounds the rod 222 adjacent its upper end on one side of the block 218.

A similar adjustable nut 238 is mounted on the lower threaded end portion 220 and serves as a seat for one end of a second helicoidal spring 237 also surrounding the shaft 222.

Reference numeral 240 indicates a substantially L-shaped lever having a leg portion 242 provided with a bifurcated upper end including arms 244, 244 having confronting and registering transversely-extending openings 246, 246, and a foot portion 248. The foot portion 248, intermediate its ends, is integrally-formed with bosses 250, 250 which project laterally from opposed sides thereof and are in open communication with each other via bore 252. The outer end 254 of the foot portion 248 is cut to form an obtuse angle with respect to the longitudinal axes thereof.

As is seen in the drawings, the pin 206 extends through the bore 252 to pivotally connect the L-shaped lever on the H-shaped connector 192.

Reference numeral 256 designates a hydraulic cylinder (see FIGURES 6 and 10) which includes an elongated, substantially hollow, cylindrical casing 258 provided with end caps 260, 262. The cap 262 has integrally-formed therewith a valve housing 264 to which further reference, infra, will be made. Disposed within the casing 258 is a reciprocable piston 266 from a side of which laterally-projects a piston rod 268. The piston rod 268 is adapted for extension through and reciprocation in the end cap 260. The exterior and outer end of the piston rod 268 connects rigidly with an enlarged boss 270 at one end of a substantially flat link 272 having a transversely-extending opening 274 formed therein. The end cap 262 is integral with an outwardly-projecting tongue 276. The tongue 276 extends between the lugs 86, 88 and is pivotally connected thereto on pin 278. The link 272 is received between the arms 246, 246 and is pivotally connected thereon by pivot pin 280.

The casing 258 and housing 264 adjacent the end cap 262 are provided with a pair of axially-spaced, transversely-extending ports 282, 284, and the port 284 is counterbored at 286 to receive a spring-biased check valve 288 therein, the valve 288 being biased for movement toward its closed position. The upper end of the port 282 is countersunk to form a valve seat 290.

The upper end of the housing 264 is open and is closed by an adjustable needle valve 294 movable toward and away from the valve seat 290, the needle valve 294 extending into one end of an elbow connector 292. The other end of the connector 292 is clamp or clip connected at 296 with one end of a flexible expansible conduit 298, the other end of the conduit 298 being clamp or clip connected at 300 with one end of a stub pipe 302 threaded in the casing 258 adjacent the cap 260. The casing 258 is adapted to be filled with a hydraulic fluid (not shown). Thus, as the piston 266 is drawn to the right, as viewed in FIGURE 6, the fluid passes through the conduit 298 toward the valve 288 unseating the latter against its bias, and returns to the casing 258 on the opposite side of the cylinder. Should the above-described movement of the piston 266 take place so rapidly as to displace a greater volume of the fluid within the casing 258 that can be freely accommodated by the valve 288, the fluid tends to back up in the conduit 298 and, being under pressure, expands the latter. A rigid pipe could be used, but the flexible conduit is preferable.

Again making specific reference to FIGURES 3, 4 and 10, it is seen that a pair of adjacent ends of a pair of bights 300, 300 of a pair of outwardly-opening U-shaped channel members 302, 302 are pivotally mounted on a shaft 304 adjacent its ends, respectively. As is clearly seen in these figures, the confronting bights 302, 302 converge rearwardly, or toward the left as viewed in FIGURES 5 and 10, and the shaft 304 is interposed between the plates 120, 120 with its opposed ends aligned with the openings 124, 124. Bolts 306 extend through the openings 124, 124 and are threaded into the adjacent ends of the shaft 304 to fixedly secure the shaft 304 thereon.

A wedge block 306 is disposed between the bights 302, 302 adjacent the converging ends thereof, the wedge block 306 having a bore 92 extending in a direction substantially perpendicular to the longitudinal axis of the shaft 304. Reference numeral 309 indicates an elongated cylindrical rod having its ends threaded at 310, 312. The threaded end 310 extends through the bore 92 and is adjustably connected to the wedge block 306 by bolts 314, 314 on the threaded end 310 and which engage opposite ends of the wedge block 306. The other threaded end 312 extends through the opening 92 formed in the bight 74 and is maintained in adjusted position relative thereto by nuts 316 that are threaded on the end 312 to engage on opposite sides of the bight 74.

An elongated eccentric 318 is carried on a cylindrical shaft 320 and is fixed against rotation thereon. One end of the shaft 320 is journaled for rotation in one of the openings 124 formed in the plate 120, while the other end of the shaft 320 is journaled in the other of the openings 120 and projects beyond the outer or exterior side of the immediately-adjacent plate 120. The projecting end of the shaft 320 is threaded at 322 for threaded engagement with one end of a hollow cylindrical coupler 324. The other end of the coupler 324 telescopically receives one end of an extension rod 326 which is releasably secured therein by a diametrically-extending cross-bolt 328. The extension rod 326, adjacent its outer end, is journaled for rotation in a hanger plate 330 subtended from the chassis frame member 54. To the extreme outer end of the extension rod 326 are connected the arms 331, 331 of a bifurcated end 332 of a cylindrical handle 333, the arms 331, 331 being fixedly secured thereto by a cross-bolt 334.

A releasable handle hold-down means is provided and comprises a hook 340 having an integral shank 342 mounted for rotation and reciprocation in the leg portion 336. The outer end of the shank 342 terminates in an enlarged manually-operable cylindrical knob 344. Interposed between the knob 344 and the adjacent side of the leg portion 336 is a helicoidal spring 348 under compression, the spring 348 surrounding an adjacent portion of the shank 342.

As is shown in FIGURES 3 and 10, the foot portion 338 is disposed in the path of movement of the handle member 333 when the latter is rotated in a clockwise direction, as indicated by the arrows in FIGURE 8. As is clearly seen in this figure, the shank 340 overlies the handle member 333 to prevent the latter from rotating in a contraclockwise direction.

An elongated, substantially rectangular lock bar 350 extends axially of the eccentric 318 and is provided with an arcuate edge 352 juxtaposed with respect to the latter (see FIGURES 3 and 10). Projecting upwardly from a side 354 thereof are a pair of longitudinally-spaced and substantially parallel rods 356, 356 having threaded outer ends 358, 358 adapted to be loosely extended, respectively, upwardly through the openings 138, 140, and through openings 360, 360 extending transversely through an elongated, substantially rectangular keeper bar 362. Nuts 364, 364 are threaded on the upper threaded ends 358, 358 whereby the effective axial length of the rod 356, 356 may be adjusted relative to the keeper bar 362 and thus adjust the position of the lock bar 350 relative to the eccentric 318.

A staple 366 (see FIGURE 3) projects from the edge 368 of the lock bar 350 substantially centrally thereof and has secured thereto one end of a helicoidal spring 370 under tension. The other end of the spring 370 is anchored to a second staple 372 depending from the bight 130. Since the rods 356, 356 are loosely engaged within the openings 138, 140, it will be understood that the helicoidal spring 370 constantly tends to bias the lock bar 350 for movement (reference being made to FIGURE 4) in a counterclockwise direction.

The loose fitting extending between the rods 356, 356 and the openings 138, 140 constitutes a deliberate design in order to accommodate eccentrics 318 having varying diameters.

Having described and illustrated the component elements of this trailer-hitch assembly in detail, a description of the operation thereof follows.

With the elements of the invention in their relative positions illustrated in FIGURE 4 of the drawings, the hitch is shown as being connected to the towing vehicle and with the bed 36 of the trailer 34 in its level position. The eccentric 318 is engaged with the lock lever 350 to hold the U-shaped channel member 128 against pivotal movement around the shaft 118. The piston rod 268 is withdrawn within the casing 258 and the free end of the foot portion 248 of the lever 240 is engaged against the bight 196.

Now, assuming that the trailer 34 has been moved to a desired location and it is intended to load or unload the beds or platforms 30, 36, the operator first releases the handle 33 and turns the same in a counterclockwise direction causing the shaft 320 to rotate in the same direction. The eccentric 318, connected thereon, is now released from beneath the lock bar 350. The two vehicles are now moved, one relative to the other, and in such a direction as to cause the proximate ends of the towing vehicle and the trailer 34 to move toward one another. This movement causes the coupler 154 to pivot in the hitch 32, and in so pivoting, causes the side arms 148 to turn in a counterclockwise direction, reference being made to FIGURES 4 and 9, inclusive, about the rod 166. This pivotal movement draws the free end of the channel member downwardly, that is, in a clockwise direction as viewed in FIGURE 9, the channel member 128 pivoting about the shaft 118. Simultaneously with this movement the rod 186 pivots in a clockwise direction about both shafts 172, 206, thereby freeing the end of the foot portion 248 of the lever 240 from the bight 196. After a limited degree of this pivotal movement has taken place, the bight 202 is engaged with the foot portion 248 of the lever 240 causing the latter to turn in a clockwise direction, reference being made to FIGURE 4. Upon the occasion of this pivotal movement, the piston head 266 is drawn to the right, reference being made to FIGURE 6, to displace hydraulic fluid from the right-hand end of the casing 258 through the conduit 298 into the valve casing 292 where the fluid displaces the check valve 288 to pass into the casing 258 on the other side of the piston head 266.

When the adjacent ends of the beds 30, 36 have been drawn into the desired proximity, the handle 333 is rotated in a clockwise direction to cause the shaft 320 and its connected eccentric 318 to turn in the same direction and to again lock behind the lock bar 350.

It will be noted that that end of the bed 36 adjacent the towing vehicle 28 may be raised or lowered by adjusting the axial length of the rod 186.

Assuming that it is now desired to return the trailer 34 to its towing position, as shown in FIGURE 1, the eccentric 318 is again rotated to disengage the same from the lock bar 350 and the vehicles are then moved relatively away from one another. This causes the channel member 128 to pivot in a counterclockwise direction about the shaft 118, and turns the rod 186 in a counterclockwise direction about the shaft 206, whereby the bight 196 re-engages the free end of the foot portion 248, effecting a counterclockwise movement of the lever 240. This, in turn, causes the retraction of the piston rod 246 into the casing 258, displacing hydraulic fluid, in this instance, through the needle valve 294, for passage through the conduit 298 and into the other end of the casing 258.

Jackknifing of the connector 192 and the rod 186 is effectively prevented by the resilient springs 236, 237.

Having described and illustrated in detail one embodiment of this invention, it will be understood that the same is offered merely by way of example, and that this invention is to be limited only by the scope of the appended claims.

What is claimed is:

1. A tractor-trailer hitch for a trailer having a chassis frame including a pair of opposed ends, a pair of laterally-spaced and confronting plates pivotally mounted on said chassis frame, an inverted substantially U-shaped channel member having one of its ends pivotally connected to said plates and having the other end thereof extending beyond one of said ends of said chassis frame, a pair of L-shaped levers pivotally connected intermediate their respective ends on said U-shaped channel member adjacent the other end thereof, a substantially U-shaped coupler having a pair of confronting arms secured, respectively, to an adjacent pair of ends of said L-shaped members, an H-shaped connector having side walls connected by a bight, said connector having one of its ends pivotally connected on said plates, an elongated rod having one of its ends pivotally connected with the other end of said connector, means pivotally connecting the other end of said rod with the other adjacent pair of ends of said L-shaped members, and a second rod having an end thereof pivotally connected with said chassis frame and its other end fixedly connected with said plates, said second rod being axially-adjustable to vertically adjust said one end of said chassis frame.

2. A tractor-trailer hitch as defined in claim 1, and means on said rods for adjusting their effective axial lengths.

3. A tractor-trailer hitch as defined in claim 1, and means on said plates engageable with said U-shaped channel member to lock said channel member in a selected pivoted position.

4. A tractor-trailer hitch as defined in claim 1, and anti-jack-knife means connected between said U-shaped channel member and said connector.

5. A tractor-trailer hitch as defined in claim 1, and a hydraulic motor including a casing and having a pair of opposed closed ends, means pivotally connecting one of said last-named ends with said chassis frame, a piston rod reciprocable on said casing and having an end projecting from the other of said last-named ends, an L-shaped lever having leg and foot portions, means pivotally connecting said leg portion with said piston rod, means pivotally connecting said last-named L-shaped lever on said connector with the foot portion thereof slidably engageable with said bight to effect movement of said piston rod in one direction, and said connector having a second bight engageable with said foot portion to effect movement of said piston rod in the opposite direction .

6. A tractor-trailer hitch as defined in claim 5, and valve means connected with said casing to control the flow of hydraulic fluid through said motor.

7. A tractor-trailer hitch as defined in claim 6, and means adjusting the effective axial length of said first and second rods.

8. A tractor-trailer hitch as defined in claim 6, and anti-jack-knife means connected between said channel member and said connector.

9. A tractor-trailer hitch for a trailer having a chassis frame including a pair of opposed ends, a first shaft having its ends supported on said chassis frame, a pair of oppositely-disposed laterally-spaced and confronting plates having a pair of adjacent ends pivotally connected on said first shaft and depending therefrom, an inverted substantially U-shaped channel member having an end pivotally connected on said first shaft with the other end thereof projecting beyond one end of said chassis frame, a second shaft mounted on the other end of said channel member, a pair of L-shaped members pivotally connected intermediate their respective ends on said second shaft, said L-shaped members being disposed in spaced confronting relation, a substantially U-shaped coupler having side arms rigidly affixed to a pair of adjacent ends of said L-shaped members, a third shaft having its respective ends supported on said plates adjacent the other pair of adjacent ends thereof, an H-shaped connector including confornting sidewalls and a pair of bights extending at right angles relative to each other, said connectors having a first pair of adjacent ends of its sidewalls pivotally connected on said third shaft, an elongated first rod having an end thereof pivotally connected with said sidewalls adjacent the other ends thereof, said first rod having its other end pivotally connected with the other adjacent pair of ends of said L-shaped members, a fourth shaft having its ends supported on said plates above said third shaft, a second rod having an end thereof connected with said chassis frame and its other end connected with said fourth shaft, a hydraulic motor including a casing having a pair of opposed ends and having a reciprocable piston rod extending through one of said closed ends, means pivotally connecting one end of said casing with said chassis frame, an L-shaped lever having foot and leg portions, means pivotally connecting said leg portion with said piston rod, said lever being pivotally connected at the junction of said foot and leg portions on said third shaft, with said foot portion extending between said first pair of adjacent ends of said sidewalls, and said foot portion being alternately engageable on opposite sides of its pivotal connection by said bights to effect operation of said hydraulic motor.

10. A tractor-trailer hitch as defined in claim 9, and a fifth shaft having its ends supported on said pair of plates, eccentric means disposed on said fifth shaft cooperating with means mounted on said channel member to lock said channel member in an adjusted pivoted position.

11. A tractor-trailer hitch for a trailer having a chassis frame including a pair of opposed ends, a pair of laterally-spaced and confronting plates pivotally mounted on said chassis frame and depending therefrom, an elongated member having one of its ends pivotally connected to said plates and having the other end thereof extending beyond one of said ends of said chassis frame, a pair of L-shaped levers pivotally connected intermediate their respective ends on said member adjacent the other end thereof, a substantially U-shaped coupler having a pair of confronting arms secured, respectively, to an adjacent pair of ends of said L-shaped members, a connector having one of its ends pivotally connected on said plates, an elongated rod having one of its ends pivotally connected with the other end of said connector, means pivotally connecting the other end of said rod with the other adjacent pair of ends of said L-shaped members, and a second rod having an end thereof fixedly connected with said chassis frame and its other end pivotally connected with said plates, said second rod being axially-adjustable to vertically adjust said one end of said chassis frame.

References Cited by the Examiner
UNITED STATES PATENTS

| | | | |
|---|---|---|---|
| 1,433,805 | 10/1922 | Deppe | 188—97 |
| 2,496,474 | 2/1950 | Hyman | 280—479 |
| 2,848,126 | 8/1958 | Taylor | 214—506 |
| 2,992,750 | 7/1961 | Brock | 214—506 |
| 3,033,323 | 5/1962 | LaManna | 188—97 |
| 3,071,267 | 1/1963 | Bunch | 214—505 |

GERALD M. FORLENZA, *Primary Examiner.*